(12) United States Patent
Kethireddy (10) Patent No.: US 8,543,946 B2
(45) Date of Patent: Sep. 24, 2013

(54) GESTURE-BASED INTERFACE SYSTEM AND METHOD

(75) Inventor: Amarender Reddy Kethireddy, Corona, CA (US)

(73) Assignee: Sharp Laboratories of America, Inc., Camas, WA (US)

(*) Notice: Subject to any disclaimer, the term of this patent is extended or adjusted under 35 U.S.C. 154(b) by 400 days.

(21) Appl. No.: 12/493,471

(22) Filed: Jun. 29, 2009

(65) Prior Publication Data

US 2010/0333044 A1    Dec. 30, 2010

(51) Int. Cl.
| | |
|---|---|
| *G06F 3/033* | (2013.01) |
| *G06F 3/048* | (2013.01) |
| *G06F 3/041* | (2006.01) |
| *G06F 9/00* | (2006.01) |
| *G06F 15/00* | (2006.01) |

(52) U.S. Cl.
USPC ........... 715/863; 715/838; 345/157; 345/173; 382/188; 358/1.9

(58) Field of Classification Search
USPC .......... 715/863, 838; 345/157, 173; 358/1.9; 382/188
See application file for complete search history.

(56) References Cited

U.S. PATENT DOCUMENTS

| | | | | |
|---|---|---|---|---|
| 5,774,591 | A * | 6/1998 | Black et al. | 382/236 |
| 6,883,140 | B1 * | 4/2005 | Acker et al. | 715/730 |
| 7,411,575 | B2 | 8/2008 | Hill et al. | |
| 2005/0057524 | A1 * | 3/2005 | Hill et al. | 345/173 |
| 2005/0275638 | A1 * | 12/2005 | Kolmykov-Zotov et al. | 345/179 |
| 2007/0069914 | A1 * | 3/2007 | Lenneman et al. | 340/691.6 |
| 2007/0177803 | A1 * | 8/2007 | Elias et al. | 382/188 |
| 2007/0287434 | A1 * | 12/2007 | Kang et al. | 455/414.1 |
| 2009/0091772 | A1 * | 4/2009 | Ujiie et al. | 358/1.9 |
| 2010/0058252 | A1 * | 3/2010 | Ko | 715/863 |
| 2010/0302144 | A1 * | 12/2010 | Burtner et al. | 345/157 |

FOREIGN PATENT DOCUMENTS

| | | |
|---|---|---|
| JP | 2005-6209 | 6/2005 |
| JP | 2010-515978 | 5/2010 |
| WO | WO 2008/086218 A2 | 7/2008 |

* cited by examiner

*Primary Examiner* — Boris Pesin
*Assistant Examiner* — Rinna Yi
(74) *Attorney, Agent, or Firm* — Brooks Acordia IP Law, PC; Pejman Yedidsion; David Ripma (57) ABSTRACT

Systems and methods of manipulating display parameters of displayed images, and optionally designating the images for manipulation, via a gesture pad.

12 Claims, 9 Drawing Sheets

GESTURE-BASED INTERFACE SYSTEM AND METHOD

FIELD OF ENDEAVOR

The present invention, in its several embodiments, related to methods, devices and systems for graphic user interfaces, and particularly pertains to gesture-based interfaces.

BACKGROUND

Computer touch screens provide touch-capability to activate a menu or toolbar of a computing device. A multi-touch interface provides to the user the ability to employ their hands, particularly two or more fingers (digits) to manipulate data and objects directly on the computer screen/device display. A gesture is a quick and patterned movement of one or more fingers or digits on a touch screen which the computing device in communication with the touch screen interprets as a command. There are several natural gestures like navigational flicks, zoom-in, and zoom-out with pinching-out or pinching-in with two fingers, rotating to left or right, and scrolling with two fingers. The touch interactions or gestures are generally direct manipulation where the touch is applied directly on the object on the touch display thereby affecting the object. An example of the state of the art of direct manipulation including gesture recognition in touch systems may be found by reviewing U.S. Pat. No. 7,411,575.

When a user may be scanning large jobs such as scanning several pictures or scanning a document consisting of several of pages, the user may find it both time-consuming and tedious to check the proper orientation of individual pictures or document pages. Users typically edit the pictures or pages on the display device or at the PC one at a time and save them. Modern scanners, such as those integrated into modern multifunctional peripherals (MFPs), offer editing capabilities via the MFP display panel and the panels may be touch-sensitive or otherwise touch enabled. Touch enabled screens support gestures for the operations such as rotate, drag & drop, and, via two-point sensed touch-motion: pinch zoom and pinch shrink. Gestures are applied on the image; gestures such as rotating with the picture with two fingers/digits on touch contact points being made, and the operation results in direct manipulation of the image. In order to apply selected gestures to an image object, the image has to be large enough for accommodating the fingers and to do the gesture. This may be possible for editing a single image or page, but when editing multiple images or pages, it may not be possible to have large enough images on the display and also in many cases user wants to do the same gesture on multiple images.

SUMMARY

The invention, in its several embodiments, includes machine-enabled methods of, and devices and systems for of manipulating display parameters of displayed images, and optionally designating the images for manipulation, via a gesture pad. For example, a method embodiment of displayed image manipulation may comprise the steps (not necessarily in the following order) of: (a) receiving, by a computing device, an image selection input designating one or more displayed images for manipulation via the touch-sensitive interface; (b) receiving an image manipulation command selection via the touch-sensitive interface; (c) receiving an image manipulation command execution input via the touch-sensitive interface; and (d) manipulating the display of the designated one or more images responsive to both the image command selection and the image manipulation command execution input via the touch-sensitive interface. For some method embodiments of displayed image manipulation, the image selection input, designating one or more displayed images for manipulation via the touch-sensitive interface, is received via the touch-sensitive interface. For some method embodiments of displayed image manipulation, the image manipulation command selection is received via the touch-sensitive interface. For some method embodiments of displayed image manipulation, the touch-sensitive interface is a touchpad comprising a gesture pad. For some method embodiments of displayed image manipulation, the touch-sensitive interface is a touch screen having a graphic user interface comprising a gesture pad.

A computing device embodiment of the present invention may comprise a processing unit and addressable memory; the processing unit configured (not necessarily executed in the following order) to: (a) receive an image selection input designating one or more displayed images for manipulation via the touch-sensitive interface; (b) receive an image manipulation command selection; (c) receive an image manipulation command execution input; and (d) manipulate the display of the designated one or more images responsive to both the image command selection and the image manipulation command execution input via the touch-sensitive interface. For some computing device embodiments, the processing may be further configured to receive the image selection input, designating one or more displayed images for manipulation via the touch-sensitive interface. For some computing device embodiments, the processing may be further configured to receive the image manipulation command selection via the touch-sensitive interface. For some computing device embodiments, the touch-sensitive interface may be a touchpad comprising a gesture pad. For some computing device embodiments, the touch-sensitive interface may be a touch screen having a graphic user interface comprising a gesture pad. A processor readable medium embodiment of the present invention may have, i.e., carry, a set of processor executable instructions, and these instructions, when executed in whole or in part by a processor cause the processor (not necessarily in the following order) to: (a) receive an image selection input designating one or more displayed images for manipulation via a touch-sensitive interface comprising a gesture pad; (b) receive an image manipulation command selection; (c) receive an image manipulation command execution input; and (d) manipulate the display of the designated one or more images responsive to both the image command selection and the image manipulation command execution input via the touch-sensitive interface. Some processor readable medium embodiments of the present invention may have a set of processor executable instructions, and these instructions, when executed in whole or in part by a processor cause the processor (not necessarily in the following order) to receive the image selection input, designating one or more displayed images for manipulation via the touch-sensitive interface. Some processor readable medium embodiments of the present invention may have a set of processor executable instructions, and these instructions, when executed in whole or in part by a processor cause the processor (not necessarily in the following order) to receive the image manipulation command selection via the touch-sensitive interface.

BRIEF DESCRIPTION OF THE DRAWINGS

Embodiments of the present invention are illustrated by way of example and not limitation in the figures of the accompanying drawings, and in which.

DETAILED DESCRIPTION

The invention, in its several embodiments includes systems and methods for applying gestures to images such as the scanned-in pages of multi-page document represented by thumbnails at a touch sensitive display or panel of, for example, a multifunctional peripheral (MFP) device, and to do so in a coordinated manner, i.e., a harmonized common fashion. Accordingly the system and method embodiments may accommodate in-line visual editing of images by applying gestures to scanned images via an MFP touch panel or on a touch computer screen. That is, embodiments of the present invention provide for an application of a gesture effect to several images at the same time with the same gesture effect. Embodiments of the present invention may include the display, the thumbnail representations of full images, and the size of the thumbnails may preclude effective application of direct manipulation gestures. Method and system embodiments of the invention may provide for the selection of the thumbnail images while the manipulation is effected a distance from the selected images via a touchpad or touch screen. The method and system embodiments may be hosted at a computer remote from a scanning and/or printing device or may be hosted at a multifunctional peripheral (MFP) device.

Figures 1, 2B:
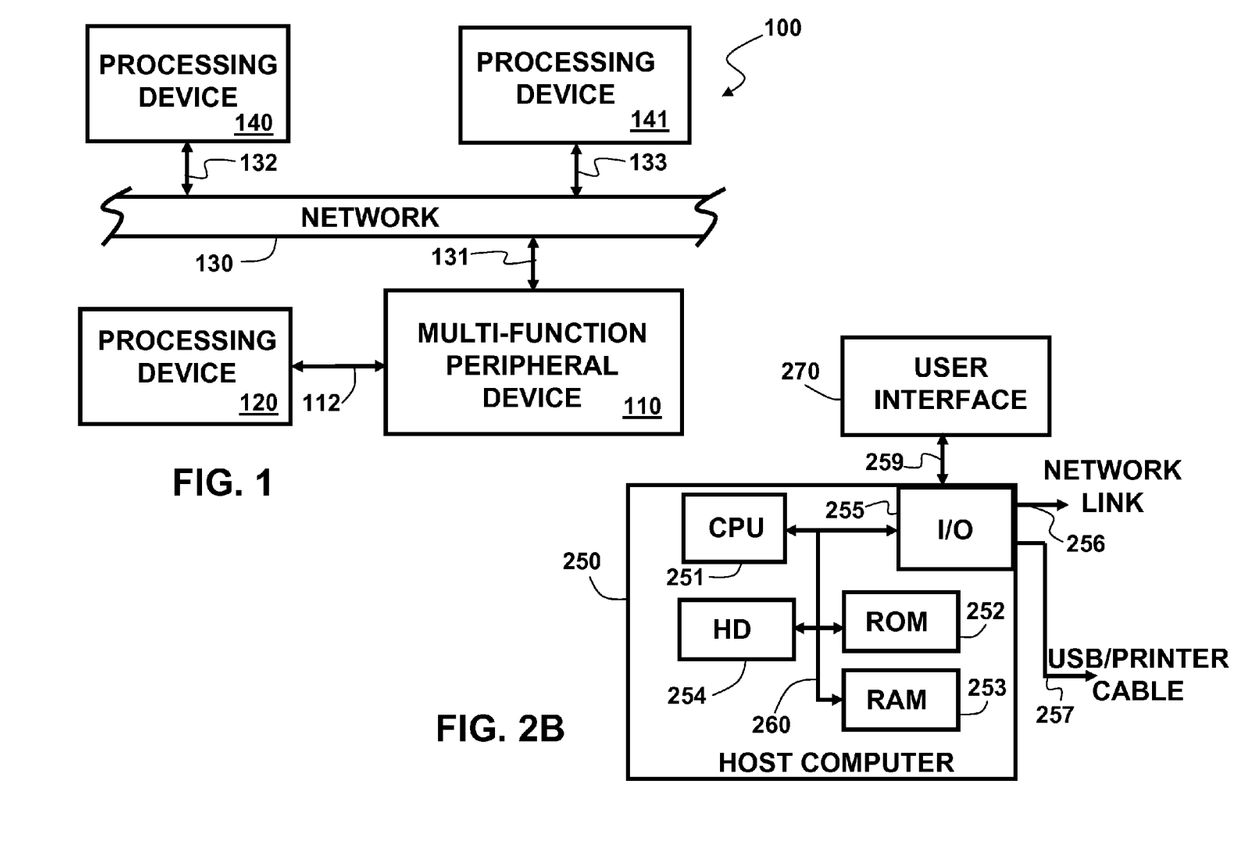
FIG. 1 illustrates, at a top level an exemplary system comprising a plurality of processing devices in communication with a multi-function peripheral (MFP) device.
FIG. 2B illustrates a top level functional block diagram of an exemplary host computer that may host a driver embodiment of the present invention.

FIG. 1 illustrates an exemplary system embodiment 100 of the present invention where a printing device or a multifunctional peripheral (MFP) device 110 may be in direct communication 112 with a processing device 120, such as a computer hosting one or more drivers applicable to the printing device or multi-functional peripheral device 110. In addition, via a network 130 and a network link 131-133, the printing device or a multi-functional peripheral device 110 may be in communication with one or more processing devices 140, 141, such as one or more computers that may each host one or more drivers applicable to the printing device or the MFP device 110.

Figure 2A:
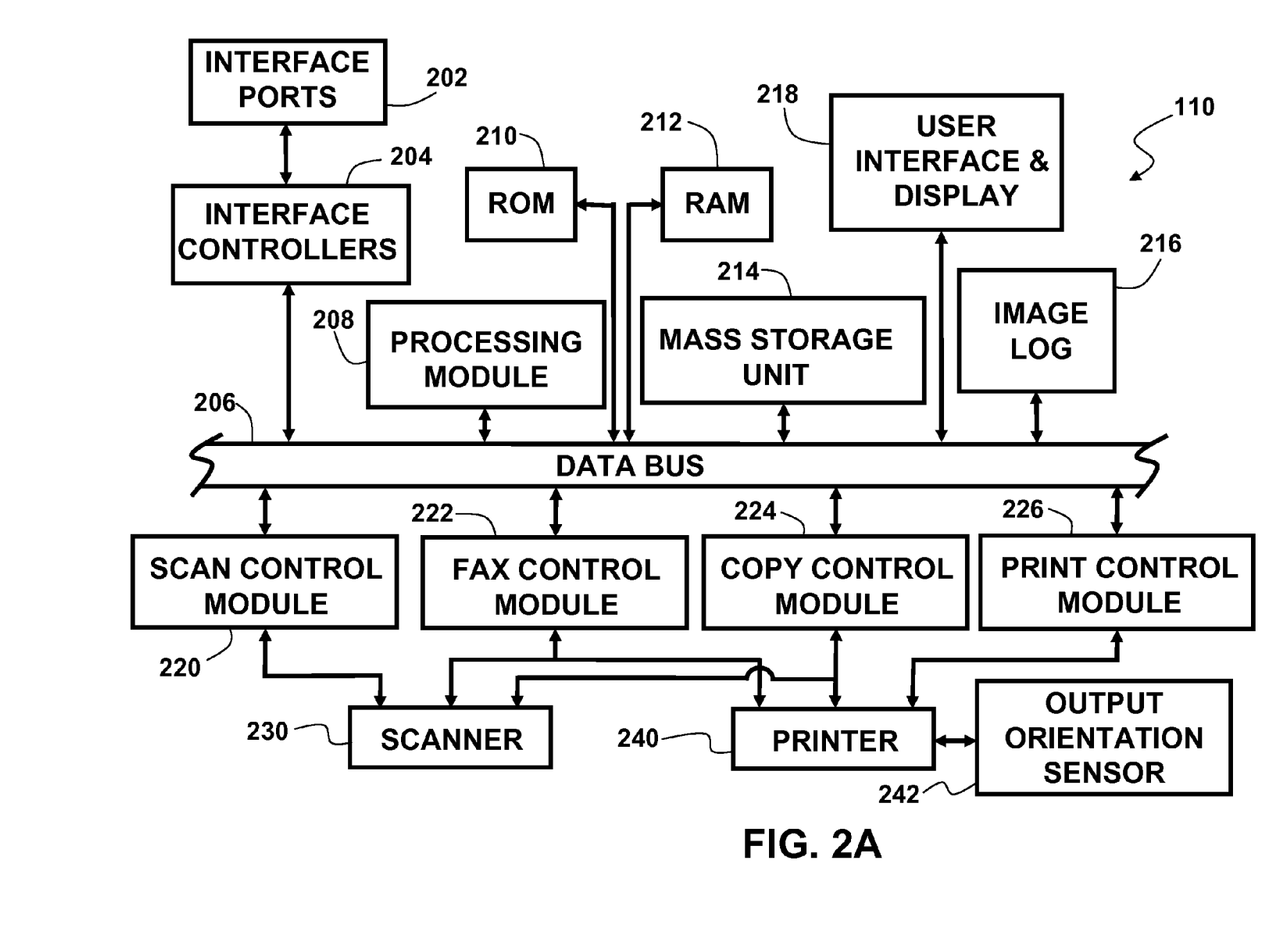
FIG. 2A illustrates a top level functional block diagram of an exemplary MFP device.

The exemplary printing device or MFP device 110 of FIG. 1 may be illustrated in greater exemplary functional detail in FIG. 2A. Interface ports 202 may be present to connect a printer cable, a network link, or an external wireless module. The interface ports 202 may be serviced by one or more interface controllers 204 that function to direct communications and/or condition signals between the respective interface port 202 and one or more modules of the MFP device 110 which may be in common communication via a data bus 206. The MFP device 110 may include one or more processing modules 208 that may draw data from read-only memory (ROM) 210 and exchange data with random access memory (RAM) 212 and may store files having sizes greater than the RAM 212 capacity in one or more mass storage units 214. The MFP device 110 may maintain a log of its images 216 and have a user display and interface 218. The image log 216 may be a separate module or distributed, for example, with a portion executed via the processing module 208 that may access parameters, files, and/or indices that may be stored in ROM 210, RAM 212, a mass storage unit 214 or in combination thereof. The MFP device 110 may include as individual or separate modules a scan control module 220, a facsimile (FAX) control module 222, and a copy control module 224 where each module may service the scanner 230 to direct communications and/or condition signals between the scanner 230 and one or more modules of the MFP device 110, for example, via the data bus 206. The MFP device 110 may include as individual or separate modules the FAX control module 222, the copy control module 224 and a print control module 226 where each module may service the printer 240 to direct communications and/or condition signals between the printer 240 and the one or more modules of the MFP device 110, for example, via the data bus 206. The exemplary MFP device 110 may store a calibration table in ROM 210, RAM 212, a mass storage unit 214 or in combination thereof and accordingly, the calibration table may be accessed by the print control module 226 and/or a processing module 208 and made available to devices external to the MFP device 110 via one or more interface ports 202. The exemplary MFP device 110 may have notice, for example, due to a user input via the user interface 218 or sensed by an output orientation sensor 242 of the printer 240 and may be communicated via the print control module 226 to devices external to the MFP device 110 via one or more interface ports 202.

FIG. 2B illustrates a top level functional block diagram of a processing device that is an exemplary host computer 250 that may host an embodiment of the present invention that, via an input/output interface 255 may interface 259 with the exemplary MFP of FIG. 2A via a wireless or wired network link 256 or a parallel, serial, or universal serial bus (USB) cable 257. The user interface 270 may include tactile input via keyboard, mouse and/or touch screen and/or audio input via a microphone. The user interface 270 may provide output to the user via a display, e.g. a graphical user interface (GUI), and/or provide audio output to the user via one or more speakers, headphones or ear buds. The host computer 250 may further comprise a central processing unit (CPU) 251, read only memory (ROM) 252, random access memory (RAM) 253 and a mass storage unit 254, such as a hard disk drive. Two or more elements of the host computer 250 may be in communication via a data bus 260. The general accessing of data, processing of data and communication and display of data may be handled at the CPU level of the host computer 250 by an operating system such as MICROSOFT™ WINDOWS™.

Figure 3:
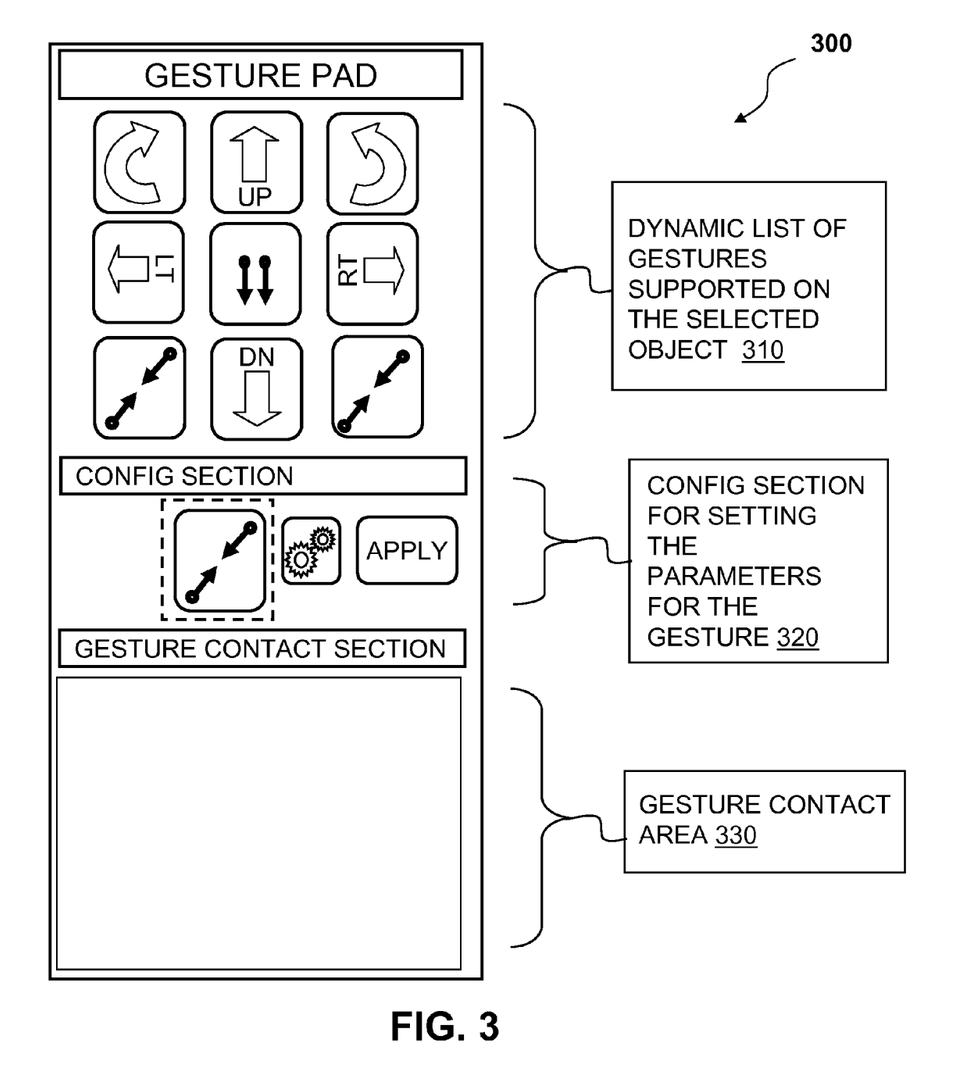
FIG. 3 illustrates an exemplary arrangement of components including icons and agesture contact section of a touch pad of an embodiment of the present invention.

FIG. 3 illustrates an exemplary arrangement of components 300 including gesture icons 310, a configuration ("config") region 320, and a gesture contact section 330 of a touch pad of an embodiment of the present invention. A gesture pad embodiment of the present invention may comprise: (a) a dynamic library of gestures supported on the selected "object," e.g., a scanned-in image or document, or other file with a displayable orientation or other visually modifiable feature; (b) a "config" section or field for receiving configuring input to configure the parameters of the selected gesture; (c) a gesture contact area on the pad for applying or visual preview of the effect of the selected gesture, or the extend of the application of the selected gesture, on the object; and (d) interfaces with the editing environment with a plug-in application programming interface (API).

Figure 4:
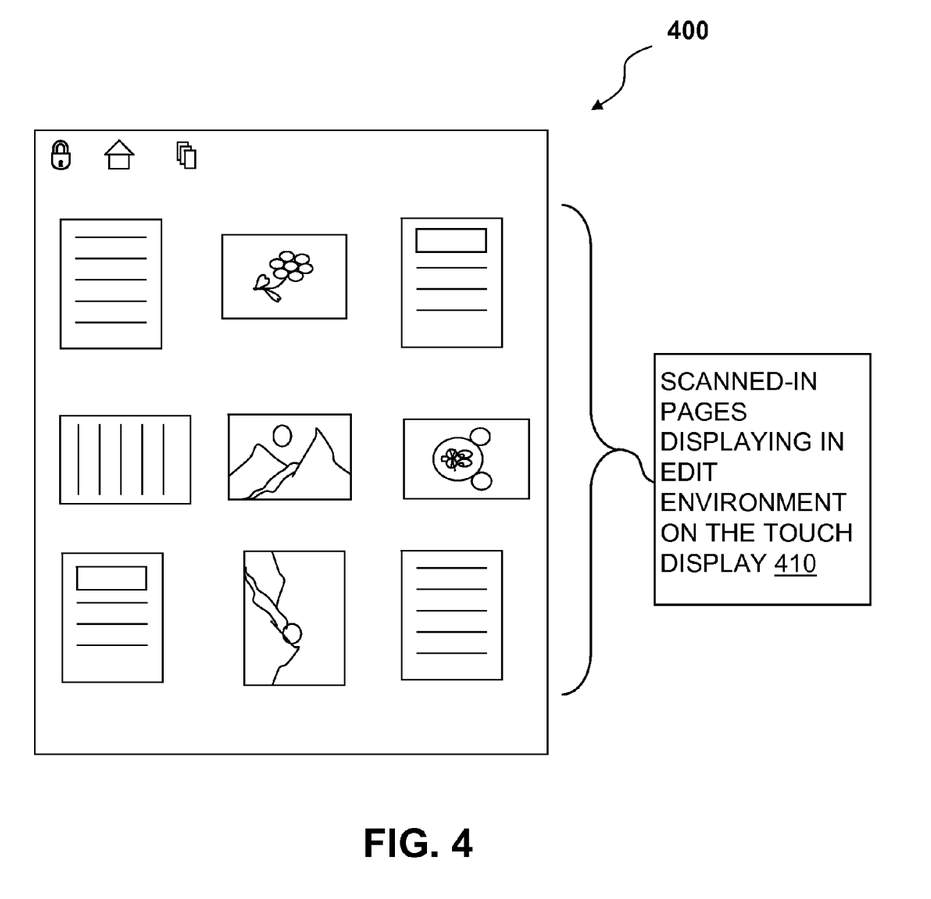
FIG. 4 illustrates a cartoon depiction of an exemplary visual imaging editing environment displayed on a touch pad.

FIG. 4 illustrates a cartoon depiction of an exemplary portion of a visual imaging editing environment 400 and array of images 410 displayed on a touch pad or touch-sensitive display screen. In this example, each exemplary page has been scanned by the MFP scanner functionality and stored as an image file in memory of the MFP and displayed as a thumbnail, i.e., an image reduced in pixel size from its corresponding stored image.

Figure 5:
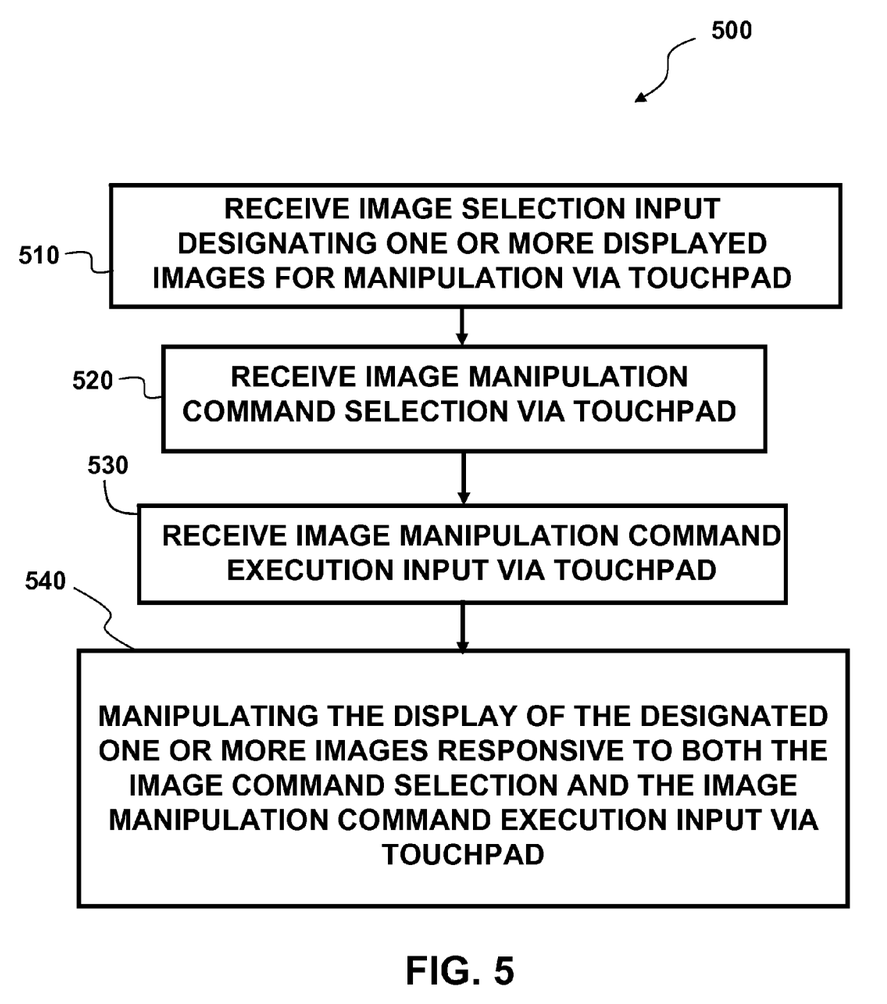
FIG. 5 is a top level flowchart of a process embodiment of the present invention.

FIG. 5 is a top level flowchart of a process embodiment of the present invention where a processing device of, for example, a computer in communication with a touch screen display embodiment of the present invention, or an MFP having a touch screen display embodiment of the present invention, configured by way of executing computer-readable instruction to perform a method 500 of displayed image manipulation where the receiving steps may be in any serial order or executed contemporaneously, the exemplary method comprising: (a) receiving, via a touchpad, an image selection input designating one or more displayed images for manipulation via the touchpad (step 510); (b) receiving an image manipulation command selection via the touchpad (step 520); (c) receiving an image manipulation command execution input via the touchpad (step 530); and (d) manipulating the display of the designated one or more images responsive to both the image command selection and the image manipulation command execution input via the touchpad (step 540).

Figure 6:
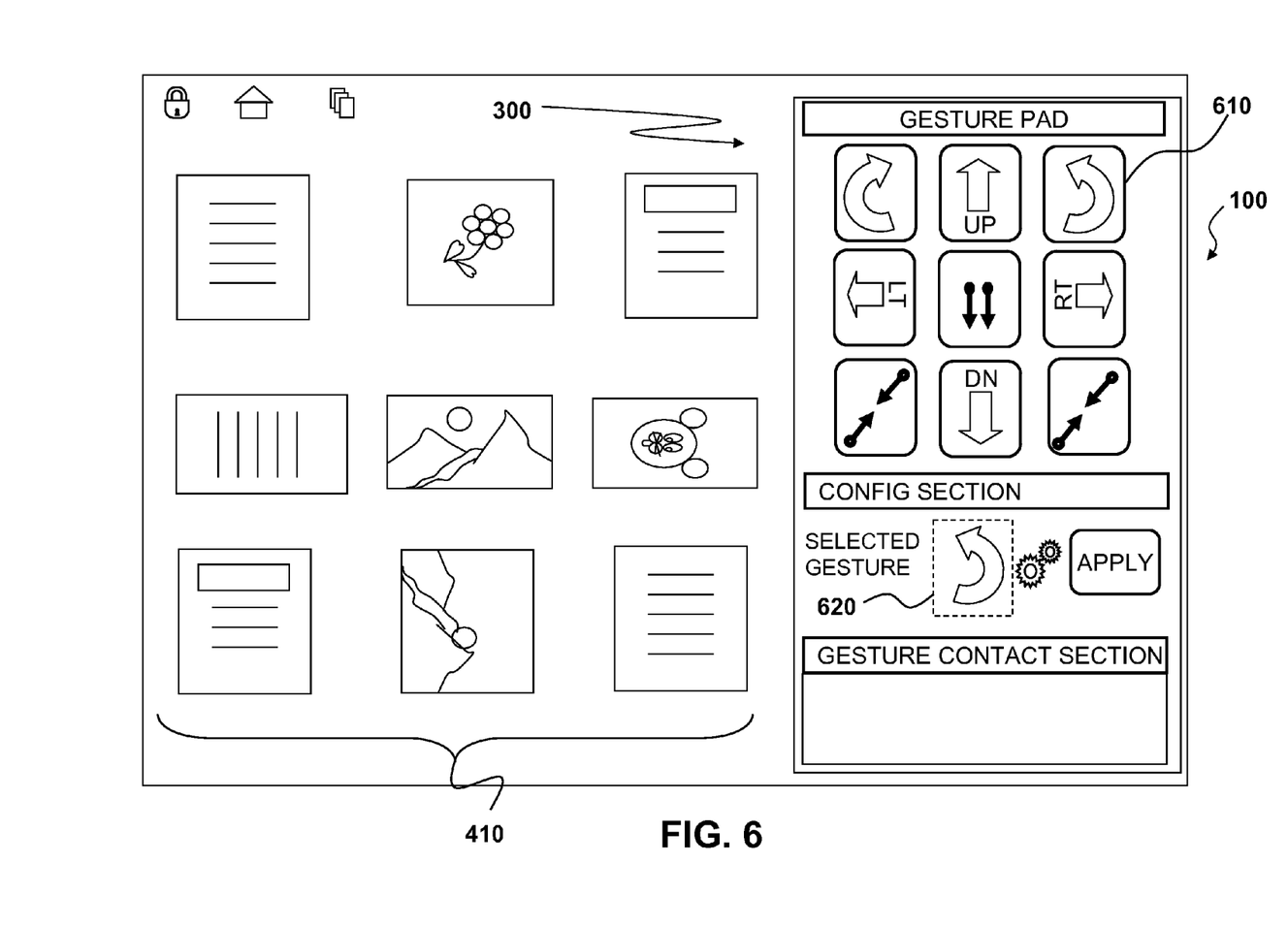
FIG. 6 illustrates in a cartoon depiction an exemplary edit environment via a gesture pad embodiment of the present invention.

FIG. 6 illustrates in a cartoon depiction an exemplary integrated edit environment 100 via a gesture pad embodiment of the present invention where an exemplary arrangement of components 300 may be displayed to the left of the array of images 410. The arrangement of components 300 may be graphically depicted as an array of icons, the gestures that may be applied to the array of images 410. FIG. 6 illustrates an example where the gesture icon for counterclockwise image rotation 610 is selected from the gesture pad and its selection indicated in the "config" section of the representative icon display prominently—in this example by being shown surrounded by a dash-lined box 620. In this example, the selected gesture may be associated with particular displayed images 410 by a touch proximate and/or within the display boundary defining the dimensional extent of a selected image.

Figure 7:
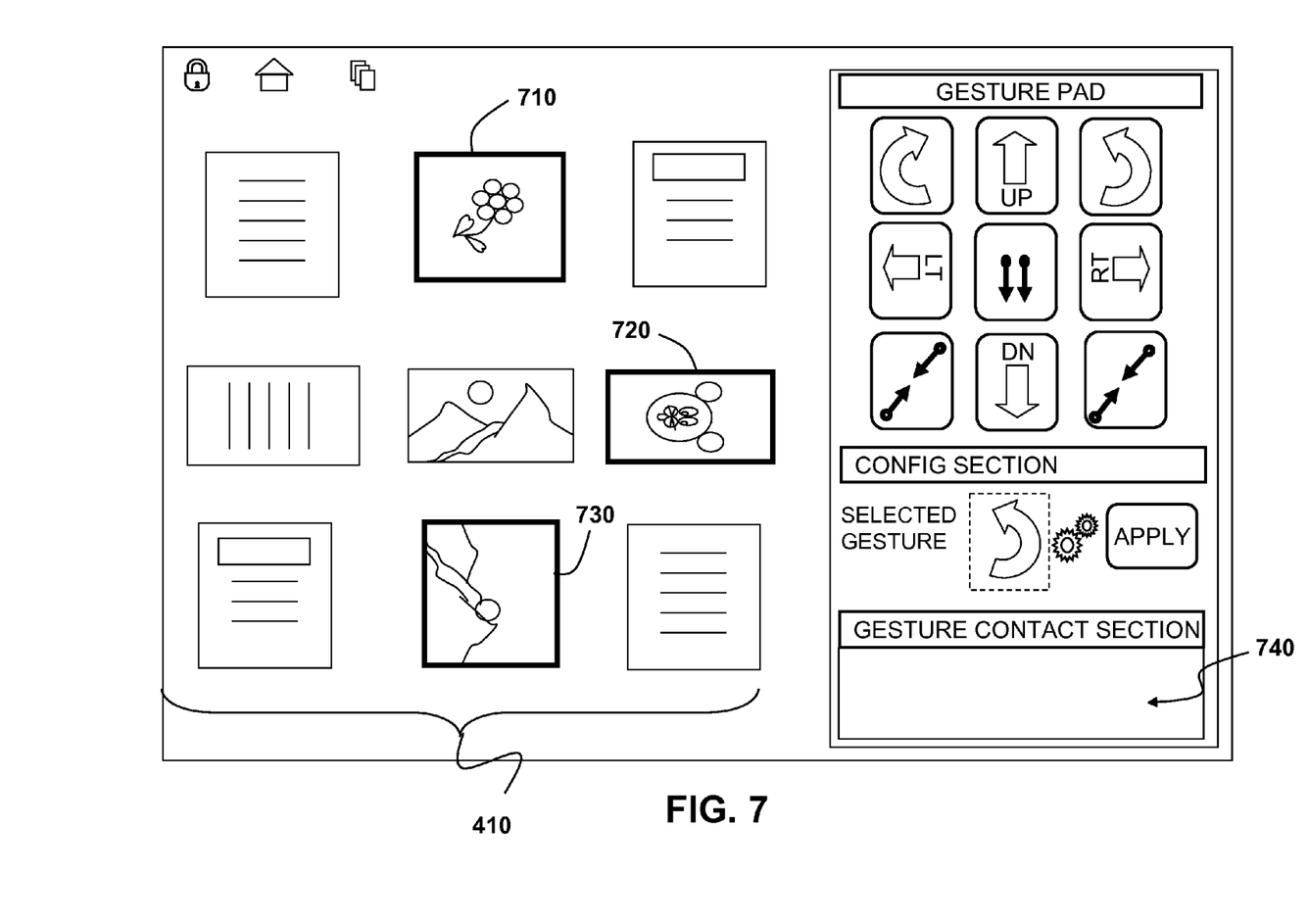
FIG. 7 illustrates in a cartoon depiction an exemplary rotation gesture simultaneously applied to selected page thumbnails of the touch display.

FIG. 7 illustrates in a cartoon depiction an exemplary rotation gesture simultaneously applied to selected page thumbnails of the touch display. In this example, an image of a still-life flower in sideways portrait 710, an image of a wildlife in sideways portrait 720, and an image of scenery landscape in sideways landscape 730, are shown selected by bold image perimeter outline. With the selection of the gesture and the selection of the images to which the gesture may be applied, the extent of the application of the selected gesture may be defined by the contact motion in the gesture contact section 740.

Figure 8:
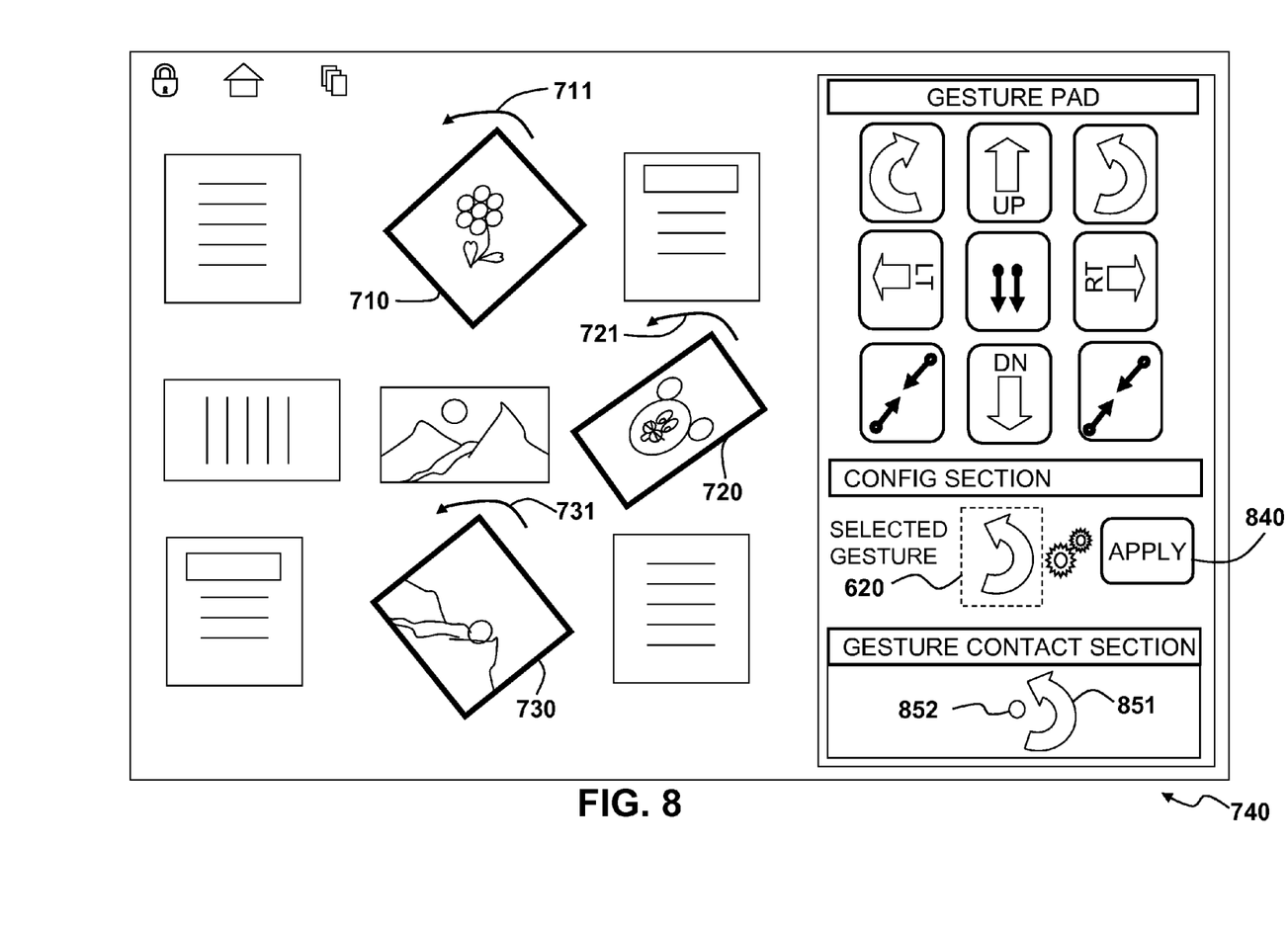
FIG. 8 illustrates in a cartoon depiction of a dynamic preview of the rotation of the selected pages responsive to a rotation gesture applied via the gesture contact area of the touch pad.

FIG. 8 illustrates in a cartoon depiction of a dynamic preview of the rotation of the selected pages, i.e., the counterclockwise rotation 711 of the image of the still-life flower 710, the counterclockwise rotation 721 of the image of the wildlife portrait 720, and the counterclockwise rotation 731 of the image of scenery landscape 730. The rotation, in this example, is responsive to a selected rotation gesture 620 applied (and graphically depicted as a counterclockwise motion 851 about a center point of rotation 852) via the gesture contact area 740 of the touch pad. The rotation, in this example, is also temporary in that the rotational change in orientation of the selected and rotated images may not be made final until a signal is received at the processor corresponding to a user action where the "APPLY" display button 840 of the "config" section has been touched.

Figure 9:
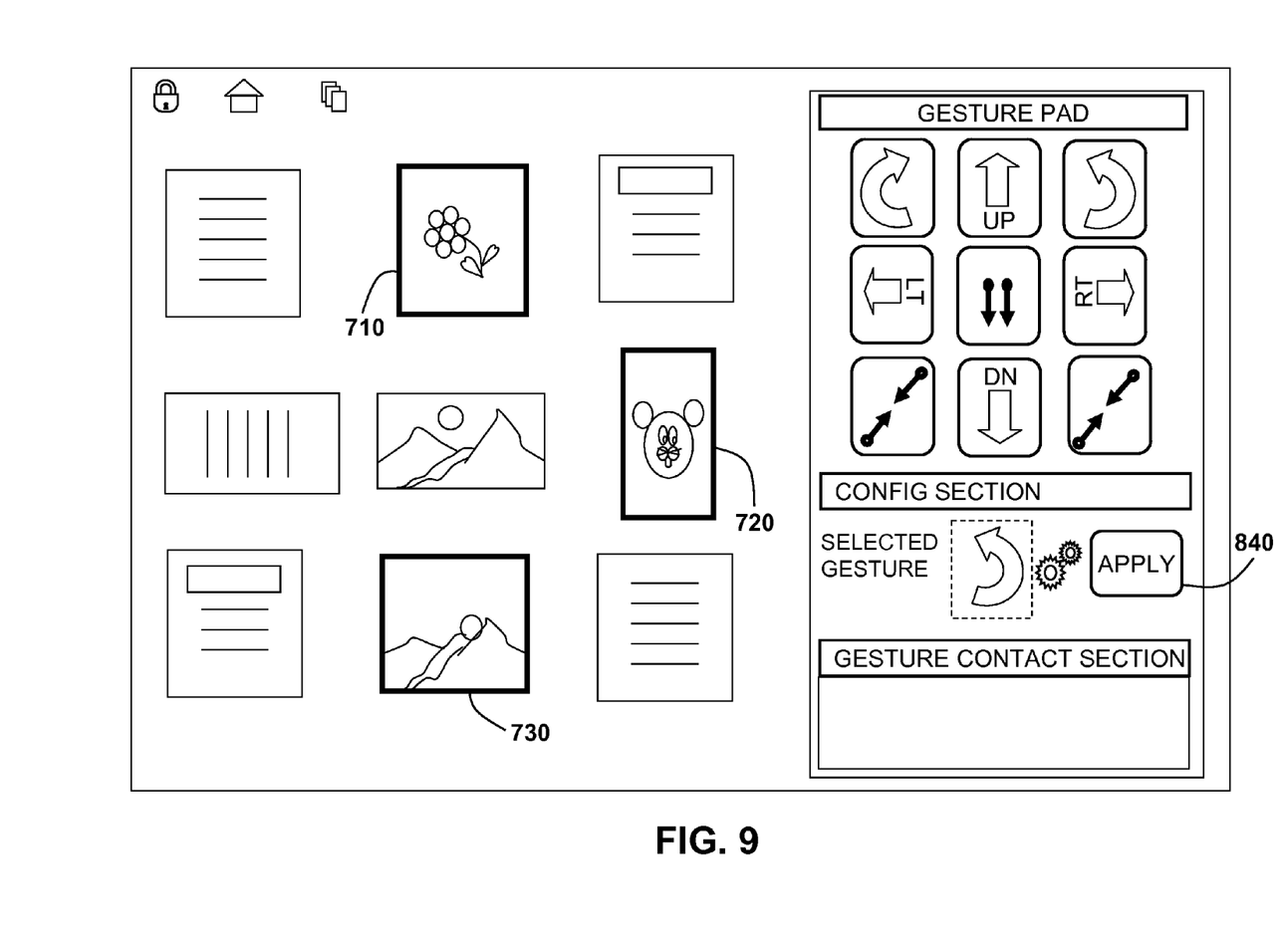
FIG. 9 illustrates in a cartoon depiction a resulting rotation of selected page thumbnails responsive to the touching of the "APPLY" button icon of the exemplary gesture pad arrangement.

FIG. 9 illustrates in a cartoon depiction a resulting rotation of selected page thumbnails responsive to the processor receiving a signal indicative of a touching of the "APPLY" button icon 840 of the exemplary gesture pad arrangement.

Embodiments of the gesture pad display icons of those gestures, of a library or set of gestures, that may support the one or more objects selected, e.g., selected image thumbnails. This dynamic filtering of the lists of supported gestures may be executed once one or more objects are selected for visual editing and/or once one or more objects are selected for the application a selected gesture. In some embodiments, a gesture may be selected from a list in place of or in addition to the display of an icon array of available gestures. Some embodiments may recognize the selected gesture by sensed touch motion in the gesture contact section and display the interpreted gesture in the "config" section. Some embodiments include user-definable parameters for a custom gesture to allow a user to configure a gesture based on gesture parameters not already available in a list or library.

An exemplary use of an embodiment of the present invention may arise where a user may be scanning several pictures for digitizing and the pictures may have different orientations, e.g., some are portrait and some are landscape, or some are sideway to the left and others are sideways to the right, and in addition to major misorientations, the pictures may not be properly oriented in the feed tray before scanning, or unevenly drawn into the scanner, and the user wants to rotate all those pictures which are not properly oriented on the display panel with rotate gesture. After the user uses the scanner to scan the pictures, the icons/thumbnails of the images may be displayed on the touch panel. The touch panel provides an editing environment for the pictures. The gesture pad of the present invention may be displayed proximate to the display of the edit environment. The user may then select the thumbnails of the pictures that the user desires to be rotated, and by making contact in the gesture pad contact area of the present invention, the user applies the desired rotation to all of the selected thumbnails with the same executed gesture. Thereafter, the user may invoke a save command to save the rotated images according to the rotated state of their respective thumbnails.

The steps and elements of embodiments of the gesture pad of the present invention may be embodied as plug-in instruction, e.g., a plug-in software application or "gadget," that may plug into the edit environment on a touch panel. The edit environment and an application embodiment of the gesture pad of the present invention may communicate the image data with the API exposed by a gesture pad process. Embodiments of the gesture pad of the present invention may include hardware which may have a limited touch-capable region, e.g., a region confined to the gesture application area on the pad and the editing environment displaying the thumbnail representations of the images available for manipulation need not be touch-capable.

One of ordinary skill in the art will also appreciate that the elements, modules, methods, and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A method of displayed image manipulation comprising:
    receiving, by a computing device, an image selection input designating a plurality of displayed images for manipulation via a touch-sensitive interface, wherein the touch-sensitive interface is a touch screen comprising a gesture pad and wherein the gesture pad displays a set of gesture icons;
    receiving a first image manipulation command selection via touch input on the gesture pad of the touch-sensitive interface, wherein the first image manipulation command selection is selected from the set of gesture icons displayed in the gesture pad of the touch-sensitive interface to manipulate the designated plurality of displayed images, and wherein a selected gesture icon for indicating the selection is displayed in a configuration section within the gesture pad that is separate from the displayed set of gesture icons;
    receiving a first image manipulation command execution input via touch input in the configuration section;
    manipulating the designated plurality of displayed images responsive to both the first image manipulation command selection and the first image manipulation command execution input, wherein the designated plurality of displayed images are manipulated simultaneously;
    receiving a second image manipulation command selection via touch input on the gesture pad of the touch-sensitive interface, wherein the second image manipulation command is selected from the set of gesture icons displayed in the gesture pad of the touch-sensitive interface to manipulate the designated plurality of displayed images, and wherein a selected gesture icon is displayed in a gesture contact section within the gesture pad that is separate from the displayed set of gesture icons and the configuration section for indicating the selection;
    receiving a second image manipulation command execution input via gestures in the gesture contact section of the touch-sensitive interface; and
    manipulating the designated plurality of displayed images responsive to both the second image manipulation command selection and the second image manipulation command execution input, wherein the designated plurality of displayed images are manipulated simultaneously.

2. The method of displayed image manipulation of claim 1 further comprising: determining a set of one or more gestures associated with the plurality of displayed images; and manipulating the display of the designated plurality of displayed images based on the determined set of one or more gestures.

3. The method of displayed image manipulation of claim 2 wherein the determining of the set of one or more gestures is via a dynamic library of gestures.

4. The method of displayed image manipulation of claim 3 wherein the dynamic library of gestures is executed based on receiving, by the computing device, the image selection input designating the plurality of displayed images for manipulation.

5. The method of displayed image manipulation of claim 2 further comprising:
    configuring the set of one or more gestures based on user-definable parameters.

6. The method of displayed image manipulation of claim 1 further comprising:
    determining a set of one or more gestures via dynamically filtering the set of one or more gestures, wherein the dynamically filtering is based on a set of one or more gestures supported for the plurality of images selected.

7. The method of displayed image manipulation of claim 6 further comprising:
    displaying a set of icons associated with the determined set of one or more gestures for manipulation of the designated plurality of displayed images via the touch-sensitive interface.

8. The method of displayed image manipulation of claim 1 wherein the selected gesture icon to manipulate display parameters of the plurality of displayed images for manipulation is associated with a gesture to rotate the plurality of displayed images.

9. A computing device comprising:
    a processing unit and addressable memory;
    the processing unit configured to:
    receive an image selection input designating a plurality of displayed images for manipulation via a touch-sensitive interface, wherein the touch-sensitive interface is a touch screen-comprising a gesture pad and wherein the gesture pad displays a set of gesture icons;
    receive a first image manipulation command selection via touch input on the gesture pad of the touch-sensitive interface, wherein the first image manipulation command selection is selected from the set of gesture icons displayed in the gesture pad of the touch-sensitive interface to manipulate the designated plurality of displayed images, and wherein a selected gesture icon for indicating the selection is displayed in a configuration section within the gesture pad that is separate from the displayed set of gesture icons;
    receive a first image manipulation command execution input via touch input in the configuration section;
    manipulate the designated plurality of displayed images responsive to both the first image manipulation command selection and the first image manipulation command execution input, wherein the wherein the designated plurality of displayed images are manipulated simultaneously;
    receive a second image manipulation command selection via touch input on the gesture pad of the touch-sensitive interface, wherein the second image manipulation command is selected from the set of gesture icons displayed in the gesture pad of the touch-sensitive interface to manipulate the designated plurality of displayed images, and wherein a selected gesture icon is displayed in a gesture contact section within the gesture pad that is separate from the displayed set of gesture icons and the configuration section for indicating the selection;

receive a second image manipulation command execution input via gestures in the gesture contact section of the touch-sensitive interface; and manipulate the designated plurality of displayed images responsive to both the second image manipulation command selection and the second image manipulation command execution input, wherein the designated plurality of displayed images are manipulated simultaneously.

10. The computing device of claim 9 wherein the selected gesture icon to manipulate display parameters of the plurality of displayed images for manipulation is associated with a gesture to rotate the plurality of displayed images.

11. A non-transitory processor readable medium having processor executable instructions thereon, which when executed by a processor cause the processor to:

receive an image selection input designating a plurality of displayed images for manipulation via a touch-sensitive interface comprising a gesture pad and wherein the gesture pad displays a set of gesture icons;

receive a first image manipulation command selection, via touch input on the gesture pad of the touch-sensitive interface, wherein the first image manipulation command selection is selected from the set of gesture icons displayed in the gesture pad of the touch-sensitive interface to manipulate the designated plurality of displayed images, and wherein a selected gesture icon for indicating the selection is displayed a configuration section within the gesture pad that is separate from the displayed set of gesture icons;

receive a first image manipulation command execution input via touch input in the configuration section; and manipulate the designated plurality of displayed images responsive to both the first image manipulation command selection and the first image manipulation command execution input, wherein the designated plurality of displayed images are manipulated simultaneously;

receive a second image manipulation command selection via touch input on the gesture pad of the touch-sensitive interface, wherein the second image manipulation command is selected from the set of gesture icons displayed in the gesture pad of the touch-sensitive interface to manipulate the designated plurality of displayed images, and wherein a selected gesture icon is displayed in a gesture contact section within the gesture pad that is separate from the displayed set of gesture icons and the configuration section for indicating the selection;

receive a second image manipulation command execution input via gestures in the gesture contact section of the touch-sensitive interface; and manipulate the designated plurality of displayed images responsive to both the second image manipulation command selection and the second image manipulation command execution input, wherein the designated plurality of displayed images are manipulated simultaneously.

12. The processor executable instructions of the non-transitory processor readable of claim 11, wherein the selected gesture icon to manipulate display parameters of the plurality of displayed images for manipulation is associated with a gesture to rotate the plurality of displayed images.

* * * * *